United States Patent

[11] 3,614,640

[72] Inventor Frederick H. Wolf
Ellicott City, Md.
[21] Appl. No. 6,096
[22] Filed Jan. 27, 1970
[45] Patented Oct. 19, 1971
[73] Assignee The United States of America as represented by the Secretary of the Navy

[54] FREQUENCY DISCRIMINATOR USING NO INDUCTIVE COMPONENTS
4 Claims, 3 Drawing Figs.

[52] U.S. Cl. .......... 329/110, 307/233, 329/112, 329/129, 329/140, 329/146, 330/84
[51] Int. Cl. .......... H03d 3/06, H03d 3/28
[50] Field of Search .......... 329/110, 112, 146, 129, 130, 140; 307/232, 233; 325/349, 487; 330/84

[56] References Cited

UNITED STATES PATENTS

| | | | |
|---|---|---|---|
| 3,409,838 | 9/1968 | McLeod | 325/349 X |
| 2,138,341 | 11/1938 | Crosby | 329/110 |
| 2,114,335 | 4/1938 | Crosby | 329/140 X |
| 2,876,346 | 3/1959 | Engstrom | 325/487 X |
| 3,277,382 | 10/1966 | Saunders | 330/84 X |

OTHER REFERENCES

Hurel et al. " Active Band-Pass Filter" IBM Technical Disclosure Bulletin Vol. 11, No. 5, p. 491 Oct. 1968 307-233

*Primary Examiner*—Alfred L. Brody
*Attorneys*—R. S. Sciascia, Thomas O. Watson, Jr. and R. R. Anderson

ABSTRACT: A frequency discriminator which is mechanized of active filters and operational amplifiers. The signal under test is simultaneously applied to a plus detector channel and a minus detector cannel these channels having active filters of band-pass configuration, one with a center frequency below the discriminator frequency and one above. The channels also have operational amplifier type detectors and the outputs of the two channels are combined, post detection filtering being accomplished by a summing amplifier by virtue of a RC feedback applied around this amplifier.

INVENTOR.
FREDERICK H. WOLF
BY Thomas O. Watson Jr.
ATTORNEY

FREQUENCY DISCRIMINATOR USING NO INDUCTIVE COMPONENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to frequency discriminators and more particularly to frequency discriminators which do not employ inductive components.

A frequency discriminator has been defined as a discriminator circuit that delivers an output voltage which is proportional to the deviations of a signal from a predetermined frequency value. It is used in frequency modulated receivers and automatic frequency controlled circuits. Prior art frequency discriminator circuits have invariably employed channels composed of accurately constructed inductive-capacitive resonant circuits. These prior art circuits, however, present inherent weaknesses in that in applications where precision frequency discriminators are required, conventional discriminators were difficult to mechanize due to the variability of the inductive components. The inductance coils in conventional discriminators are difficult to wind so as to obtain an exact amount of required reactance, there are mutual inductance problems between the individual windings themselves, the coils are susceptible to interference from stray radiation, and they even at times change frequency due to changes in temperature. Therefore, in circuits requiring a precision frequency discrimination, such as where an AFC circuit controls the frequency of a local oscillator in a system utilizing a narrow band receiving system, the drift of the error detecting discriminator frequency is sufficient to cause considerable performance degradation.

SUMMARY OF THE INVENTION

Thus, since it would seem that the inductance component of a frequency discriminator is the main culprit in causing poor performance of the circuit, the present invention offers considerable improvement over these prior art devices in that it eliminates the inductance component entirely. In accomplishing this improvement the present invention utilizes a combination of active networks and operational amplifiers and the active filters, even though using no inductance, have a transfer function equivalent to that of a tuned circuit, and the selection of the particular component value will be a function of the overall requirements of the discriminator such as band width and linearity. If the feedback components are chosen to have zero or very low temperature coefficients, practically all frequency drift of the discriminator can be eliminated.

OBJECTS OF THE PRESENT INVENTION

An object of the present invention is the provision of a frequency discriminator using no inductive components.

Another object of the present invention is the provision of a frequency discriminator which uses a combination of active networks and operational amplifiers.

Still another object of the present invention is the provision of a frequency discriminator in which temperature drift problems of the detection diodes have been eliminated.

Yet another object of the present invention is the provision of a frequency discriminator utilizing active filters and no inductors which exhibit a transfer function equivalent to that of a tuned circuit.

Yet another object of the present invention is the provision of a frequency discriminator which is not only stable but has substantial gain at the frequency of interest.

Other objects, advantages and novel features of the invention will become apparent from the following detailed description of the invention when considered in conjunction with the accompanying drawings.

DESCRIPTION OF THE PREFERRED EMBODIMENTS

Figure 1:
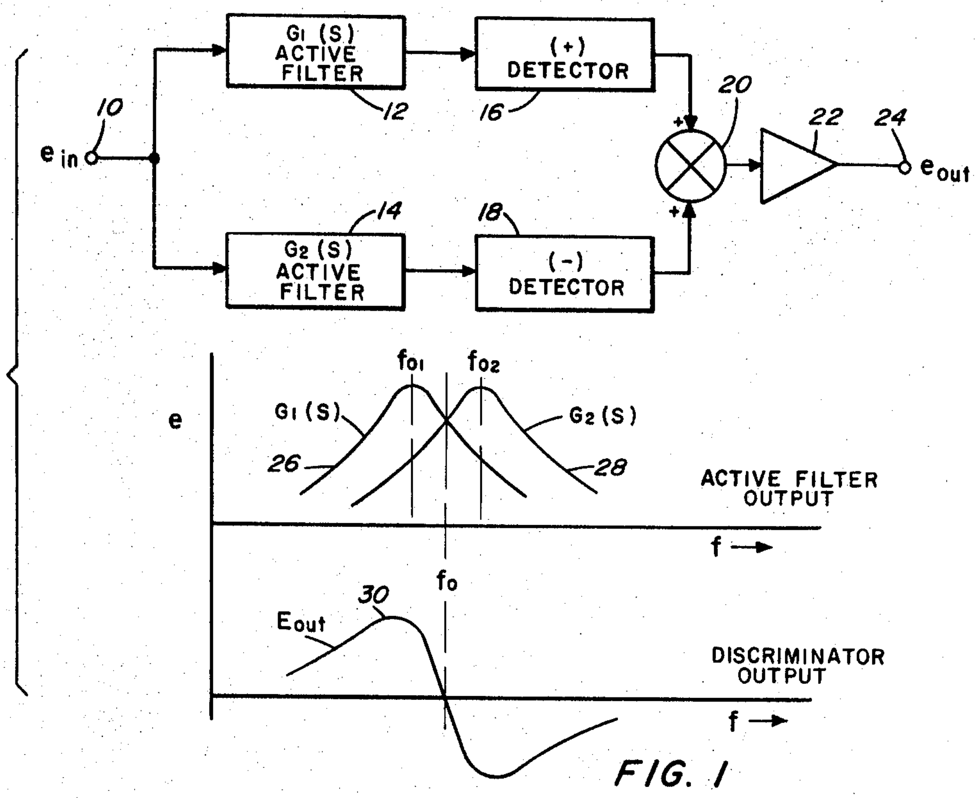
FIG. 1 illustrates a block diagram of the discriminator plus important waveforms.

Referring now to the drawings there can be seen in FIG. 1 an input terminal 10 wherein the input signal is divided into two channels, one channel being an active filter 12 which connects to a positive detector 16 whose output goes to a mixing device 20. The other channel consists of an active filter 14, a minus detector 18 and a connection also to mixer 20, the mixed signals from 20 being applied to an amplifier 22 and then to an output terminal 24. In the waveforms associated with FIG. 1, in which voltage output is plotted against frequency, the topmost graph shows active filter output and it can be seen that the output of filter 12, as shown by curve 26, has its center frequency slightly below the desired discriminator output frequency, while the output of filter 14, shown by curve 28, has its center frequency slightly above that of the discriminator frequency. The resulting discriminator output, has shown by the bottom graph, or the discriminator output as appearing on output terminal 24 has the waveform 30.

Figure 2:
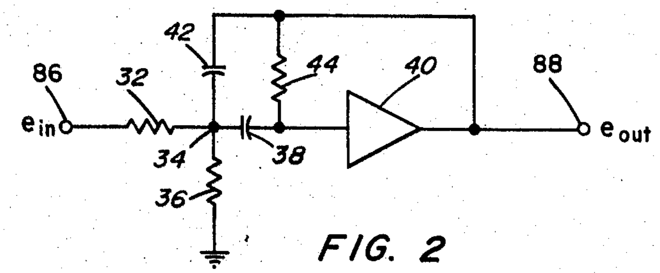
FIG. 2 shows schematically an active filter using no inductors which has a transfer function equivalent to that of a tuned circuit.

In FIG. 2 there is shown schematically one embodiment of an active filter using no inductors which has a transfer function equivalent to that of a tuned circuit. Here input terminal 86 leads to a resistor 32 whose output is tied to terminal 34. The output of terminal 34 divides into two channels, one to a resistor 36 which forms a path to ground and the other to a condenser 38, the output of this condenser being applied to an amplifier 40 whose output is applied to the output terminal 88. To form a feedback loop for the amplifier there is shown a circuit consisting of a capacitance 42 which is connected to terminal 34 and a resistor 44 which is connected to input of the amplifier 40.

Figure 3:
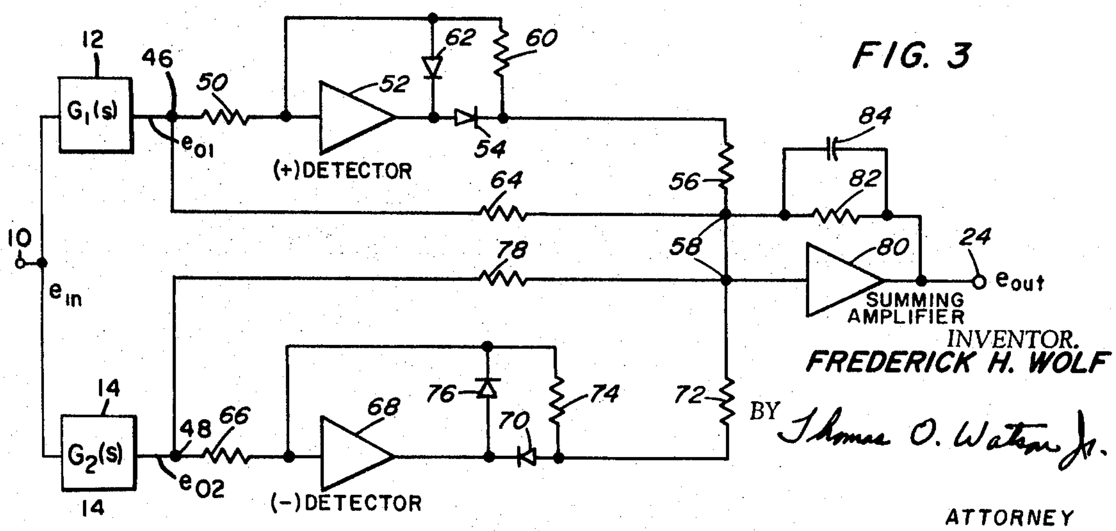
FIG. 3 shows a schematic diagram of a frequency discriminator utilizing operational amplifier-type detectors.

In FIG. 3, which depicts the preferred embodiment of the invention, there is shown an input terminal 10 where the signal divides into two channels as before and is impressed on terminals 46 and 48 after passing through active filters 12 ans 14, respectively. Connected to terminal 46 there is a resistor 50 which makes a series connection to an operational amplifier 52, the output of the amplifier 52 being applied to the anode of a diode 54. From the cathode of diode 54 the signal passes through another resistor 56 before being impressed upon a junction 58. Another resistor 60 which is connected between the cathode of diode 54 and the input of amplifier 52 serves as a feedback loop. Connected from one end of resistor 60 to the anode of diode 54 is a second diode 62, diodes 54 and 62 operating as a full wave detector as will be described more fully hereinafter. Joining terminal 46 with junction 58 there is yet another resistor 64.

The lower half of the circuit of FIG. 3 is similar to the upper half. From terminal 48 a signal is passed through a resistor 66 from whence it passes through an operational amplifier 68 onto the cathode of a diode 70 from whence it passes through another resistor 72 before being applied to junction 58. A feedback loop is accomplished by means of a resistor A which is connected between the anode of diode 70 and the input to amplifier 68. A second diode 76 connects between the cathode of diode 70 and the input of amplifier 68, and it will be noted that these two diodes are poled in the reverse direction from those in the upper half of the circuit namely diodes 54 and 62. Still another resistor 78 is used to connect terminal 48 with junction 58. From junction 58 the signal is again divided into two parallel channels, one in which a signal passes through a summing amplifier 80 the output of this amplifier being impressed upon an output terminal 24. The other channel consists of a parallel resonant filter comprising a resistor 82 in parallel with a capacitance 84, this filter being connected between junction 58 and output 24.

Turning now to the operation of the device it can be seen that the invention utilizes a combination of active networks and operational amplifiers using no inductance components. In FIG. 1, for example, the signal impressed on input 10 divides through two parallel channels of filter 12 and detector 16 and also filter 14 and detector 18 their outputs being summed in device 20 before being applied to an amplifier 22 for impressing on the output terminal 24. The active filters 12 and 14, having wave forms 26 and 28, respectively, are of a band-pass configuration; one with a center frequency below the discriminator frequency and one above. FIG. 2 shows schematically an active filter using no inductors which has a transfer function equivalent to that of a tuned circuit. The selection of the particular component values will be a function of the overall requirements of the discriminator, such as bandwidth and linearity. If the feedback components are chosen to have zero, or very low, temperature coefficients, practically all frequency drift of the discriminator can be eliminated. However, care must be taken in the selection of the amplifier and its compensation to assure that it is stable and has sufficient gain at the frequencies of interest.

In FIG. 3 the outputs of the active filters 12 and 14 are detected by operational amplifier type detectors comprising amplifier 52, diodes 54, 62, and resistor 60, as well as amplifier 68, diodes 70, 76, and resistor 74, and their outputs, one positive and the other negative, are summed in another operational amplifier 80 with a low-pass configuration for ripple filtering. Temperature drift problems of the detection diodes 54, 62, 70 and 76 are eliminated by the operational amplifier-type detectors such as 52 and 68. Both drift and linearity are greatly improved by this closed loop configuration, formed by resistors 60 and 74. The full wave detection of diodes 54 and 62 as well as 70 and 76 are used to reduce ripple and decrease the filtering requirements of the summing amplifier 80.

Post detection filtering is accomplished by the summing amplifier 80 by virtue of the RC feedback loop, that is resistor 82 and capacitor 84, applied around this amplifier. Selection of the value of this feedback resistor, namely 82, is also a convenient means to set the scale factor of the discriminator.

Returning now again briefly to FIG. 2 it can be shown by mathematical derivation that the center frequency of the active filter can be changed by the variation of resistor 36 while not affecting either the bandwidth or gain of the stage. This offers a simple method of tuning the discriminator. If resistor 36 of one of the active filters is made variable, the crossover frequency of the discriminator can be adjusted to the desired value in spite of initial component tolerances. This is the only adjustment required in the circuit.

From the above description of the structure and operation of the device it is obvious that the present invention offers many improvements over similar prior art systems. The advantages of the invention are its stability, its small size and weight when mechanized with integrated circuits, simplicity of adjustment, ease of manufacture, and high degree of reliability.

Obviously many modifications and variations of the present invention are possible in the light of the above teaching.

What is claimed is:

1. A frequency discriminator comprising:
   - means for receiving an input signal whose frequency is being tested;
   - a positive detector channel;
   - a negative detector channel;
   - means for applying the input signal to both the positive and the negative detector channels;
   - inductorless frequency selection means in each detector channel including an active filter;
   - detector means in each detector channel including an operational amplifier, a full wave rectifier, and temperature stabilization means;
   - said temperature stabilization means includes a resistor feedback from the output of the full wave rectifier to the input of said operational amplifier; and
   - means for summing the output of the detector channels including a passive filter and an operational amplifier connected in parallel, wherein the passive filter is an RC circuit.
2. The device of claim 1 wherein the positive channel active filter has a bandpass configuration with a center frequency above the desired discriminator frequency.
3. The device of claim 2 wherein the negative channel active filter has a bandpass configuration with a center frequency below the desired discriminator frequency.
4. The device of claim 1 wherein said active filter includes means for varying the center frequency of the active filter without affecting the bandwidth or the gain thereof comprising a variable resistor connected between the capacitive input to the amplifier of the active filter and a suitable reference potential.